United States Patent
Kivisaari et al.

(10) Patent No.: US 8,221,928 B2
(45) Date of Patent: Jul. 17, 2012

(54) PREHEATING ARRANGEMENT IN A FUEL CELL APPARATUS

(75) Inventors: Timo Kivisaari, Helsinki (FI); Timo Mahlanen, Helsinki (FI)

(73) Assignee: Wärtsilä Finland Oy, Vaasa (FI)

( * ) Notice: Subject to any disclaimer, the term of this patent is extended or adjusted under 35 U.S.C. 154(b) by 868 days.

(21) Appl. No.: 12/305,927

(22) PCT Filed: Jun. 15, 2007

(86) PCT No.: PCT/FI2007/050360
§ 371 (c)(1),
(2), (4) Date: Dec. 19, 2008

(87) PCT Pub. No.: WO2007/147939
PCT Pub. Date: Dec. 27, 2007

(65) Prior Publication Data
US 2010/0239926 A1 Sep. 23, 2010

(30) Foreign Application Priority Data
Jun. 22, 2006 (FI) .................................... 20065433

(51) Int. Cl.
*H01M 8/04* (2006.01)
(52) U.S. Cl. ........ 429/440; 429/408; 429/410; 429/433; 429/434; 429/435; 429/441; 429/442
(58) Field of Classification Search .................. None
See application file for complete search history.

(56) References Cited

U.S. PATENT DOCUMENTS

| | | | |
|---|---|---|---|
| 3,576,677 A * | 4/1971 | Keating | 429/431 |
| 5,308,456 A * | 5/1994 | Kunz et al. | 429/410 |
| 6,077,620 A | 6/2000 | Pettit | |
| 6,413,661 B1 | 7/2002 | Clingerman et al. | |
| 2003/0235733 A1 | 12/2003 | Haltiner | |
| 2004/0146763 A1 | 7/2004 | Pondo | |

FOREIGN PATENT DOCUMENTS
WO 2004104140 12/2004

OTHER PUBLICATIONS

Fernandes Morales, N, European Search Report for EP 07788745, Mar. 3, 2010.

* cited by examiner

*Primary Examiner* — Cynthia Lee
(74) *Attorney, Agent, or Firm* — Chernoff, Vilhauer, McClung & Stenzel

(57) ABSTRACT

The present invention relates to a preheating arrangement in a fuel cell apparatus, the fuel cell apparatus comprising at least a fuel cell unit having an anode side and a cathode side with an electrolyte therebetween, the fuel cell apparatus having at least a fuel inlet to the anode side and an oxygen-containing air inlet to the cathode side as well as a sulphur removal unit and a fuel modifying unit and an afterburner for combustion the exhaust gases from the anode and/or cathode side. According to the invention, the afterburner is provided with a separate fuel inlet channel for introducing fuel to the afterburner during the start-up phase of the fuel cell apparatus and that at least a part of the exhaust gases formed in the combustion of the separately fed fuel is arranged to be directed from the afterburner for heating at least the sulphur removal unit and/or the fuel modifying unit during the start-up phase. The outlet channels are provided with heat exchangers and adjustment means for adjusting the exhaust gas flow rate.

11 Claims, 2 Drawing Sheets

PREHEATING ARRANGEMENT IN A FUEL CELL APPARATUS

Figure 1:
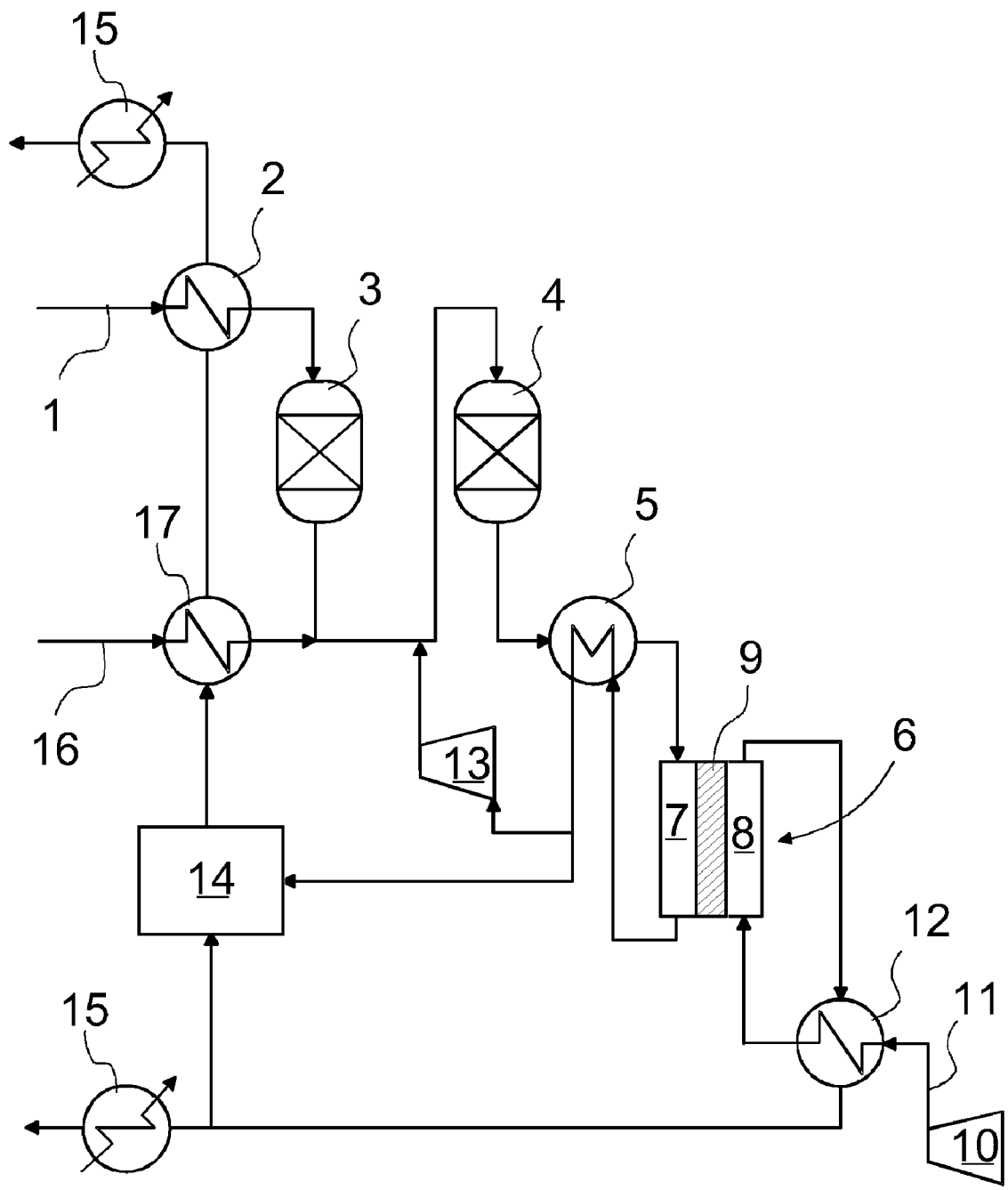

This is a national stage application filed under 35 USC 371 based on International Application No. PCT/FI2007/050360 filed Jun. 15, 2007, and claims priority under 35 USC 119 of Finnish Patent Application No. 20065433 filed Jun. 22, 2006.

The present invention relates to a preheating arrangement in a fuel cell apparatus according to preamble of claim 1, the fuel cell apparatus comprising at least a fuel cell unit having in its fuel cells an anode side and a cathode side with an electrolyte therebetween, the fuel cell apparatus having at least a fuel inlet to the anode side and an oxygen-containing air inlet to the cathode side and a sulphur removal unit, fuel modifying unit as well as a burner for combusting the exhaust gases from the anode and/or cathode side.

The invention also relates to a method of preheating a fuel cell apparatus.

One energy source of the future with a good efficiency is the fuel cell, by means of which fuel is directly transformed into electric energy via a chemical reaction. A fuel cell contains two electrodes, an anode and a cathode with an ion-conductive material, called the electrolyte, therebetween. Natural gas or other hydrocarbon is often used as fuel and usually the fuel must first be converted into fuel used by the fuel cell by means of, for example, reforming it. Thus treated, the fuel is introduced into the anode of the fuel cell, and correspondingly the oxygen needed for the reaction is introduced into the cathode of the fuel in the form of, for example, air. In the reaction the electrons are released from hydrogen of the fuel on the anode of the fuel cell wherefrom they traverse via an external circuit, i.e. a load situated behind the fuel cell, to the cathode of the fuel cell. Thus, hydrogen is combined with oxygen in the fuel cell, forming heat and energy, the energy being directly formed as electric energy with no need to transform the energy into mechanical form. The potential difference created by a single fuel cell is, however, typically so small that it is useful to form from the fuel cells a unit of a number of fuel cells connected in series, a so-called fuel cell stack, with the further possibility of connecting the stacks in series or in parallel for further increasing the voltage or current. The advantages of the fuel cells are, among others, good efficiency, lack of noise and very low number of moving parts. Another advantage are the environmentally friendly and clean emissions comprising only water or water vapour.

The fuels used in a fuel cells power plant usually need, depending on the fuel, various pre-treatments prior to introducing the fuel to the fuel cells. These pre-treatment operations can, for example, include sulphur removal, producing hydrogen from the raw material of the fuel or other catalytic or non-catalytic methods. Regardless of the methods used, the pre-treatment operations usually occur in temperatures much higher than the ambient temperature. Because of this, the materials flowing in the process must be heated either so that they are heated before the actual treatment process by means of a heat exchanger or by transferring heat into the reaction vessel or reactor in which the actual pre-treatment takes place. It is also possible to use both the above-mentioned methods together.

According to prior art, this need of pre-treatment for heat is fulfilled by circulating the exhaust gases produced by the afterburner via a heat exchanger, in which heat is transferred to the raw material of the fuel to be treated. In addition to this the tubes and reaction vessels with their contents are electrically heated by means of an external trace heating and heating resistors. A disadvantage of such prior art solutions is the great need for and consumption of external electricity at the start-up phase of the fuel cell system, because the fuel cell system itself can not yet produce enough electric energy for preheating. Another disadvantage is that using electric energy for the said preheating at a later actual operation stage of the system consumes part of the electricity produced by the fuel cells themselves. Due to this, the electrical efficiency of the fuel cell apparatus is decreased.

The object of the invention is to provide an inexpensive and reliable preheating arrangement in a fuel cell apparatus, by means of which the above-mentioned prior art disadvantages can be eliminated. An especial object of the invention is to provide a preheating arrangement in a fuel cell apparatus, in which the system can be started at least partly or totally without external electrical heating. A further object of the invention is to provide a solution in which the fuel and/or reactor vessels can be preheated without electricity produced by the fuel cells themselves. It is also an object of the invention to provide a solution in which the reactor vessels used can be heated during operation without need for external electricity or electricity produced by the fuel cells.

The preheating arrangement according to the invention is characterized by what is disclosed in the characterizing part of claim 1. The method according to the invention is characterized by what is disclosed in the characterizing part of claim 7. Other embodiments of the invention are characterized by what is disclosed in other claims.

The basic idea of a preheating arrangement according to the invention is that a separate fuel inlet channel to the afterburner is arranged for introducing fuel to the afterburner during the start-up phase of the fuel cell apparatus and that the arrangement comprises a channel leading from the afterburner to the sulphur removal unit for directing exhaust gas to the sulphur removal unit and an outlet channel for removing exhaust gas from the sulphur removal unit and/or a channel from the afterburner to the modifying unit for directing exhaust gas to the modifying unit and an outlet channel for removing exhaust gas from the modifying unit. Additionally, the outlet channel of the sulphur removal unit is provided with an adjustment means for adjusting the gas flow and the exhaust channel comprises a heat exchanger between the adjustment means and the sulphur removal unit and/or the exhaust channel of the modifying unit is provided with an adjustment means for adjusting the flow rate of exhaust gas and the outlet channel comprises an heat exchanger between the adjustment means and the modifying unit.

In one embodiment of the invention the sulphur removal unit is enveloped by a casing connected to a channel through which at least part of the exhaust gases of the afterburner is arranged to be directed into said casing. The advantage in this case is, among others, that the reactor vessel can be preheated without external electrical energy during start-up phase. Another advantage is that the reactor vessel can be preheated to the correct process temperature during operation without using electric energy. This increases the efficiency of the fuel cell apparatus in comparison with prior art apparatuses because there is no need to use the electric energy produced by the fuel cells themselves for preheating the reactor vessel.

Figure 2:
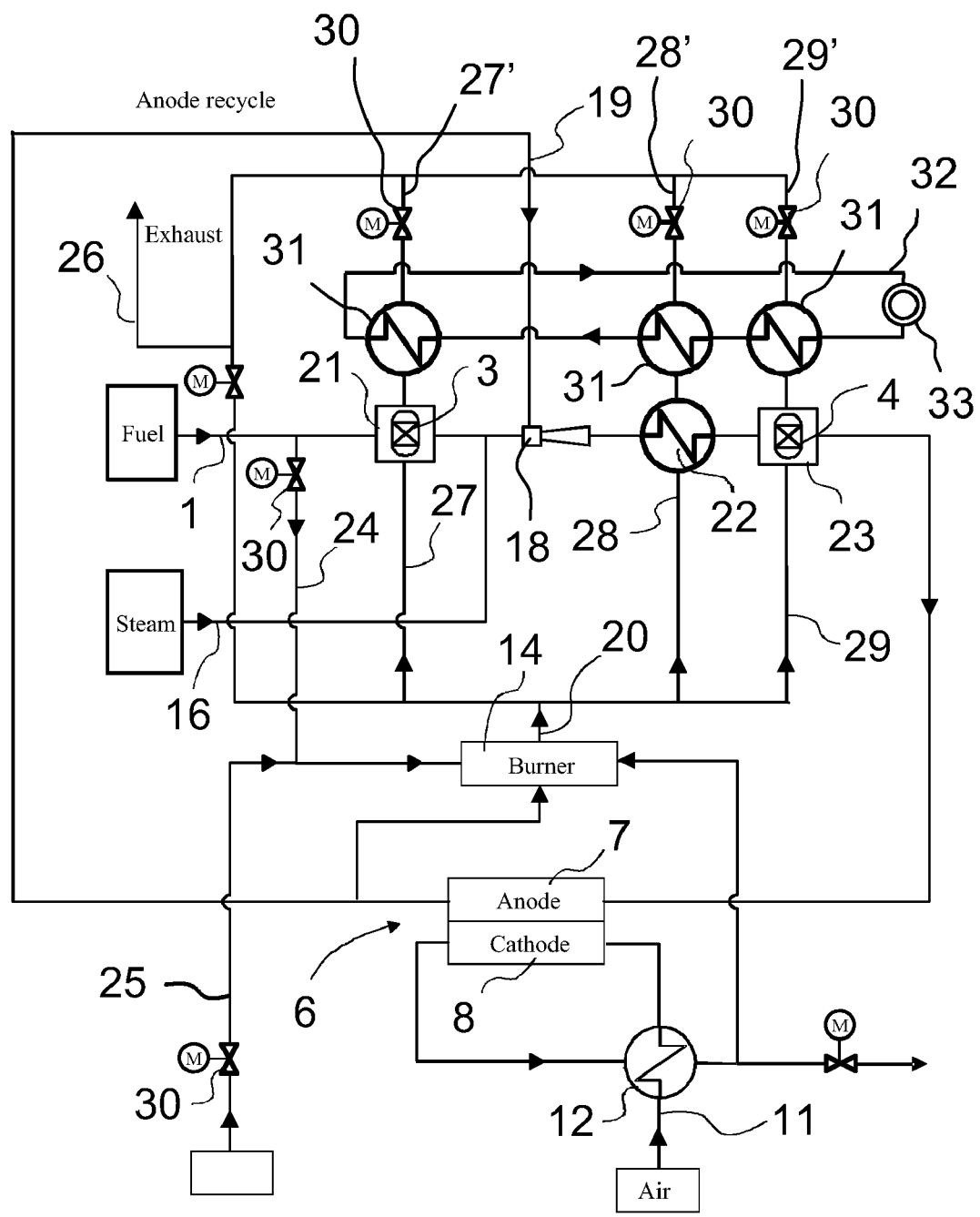

In the following, the invention is described in more detail using one embodiment and with reference to the appended drawings, in which FIG. 1 is a simplified and schematic illustration of a typical fuel cell apparatus, and FIG. 2 is a simplified and schematic illustration of an arrangement according the invention applied to a fuel cell apparatus.

FIG. 1 shows, in a schematic and simplified manner, a typical fuel cell apparatus in which the preheating arrangement according to the invention can well be used. FIG. 1 shows a fuel cell apparatus in which fuel cell stacks operating in high temperature forming the fuel cell unit 6 can consist of, for example, solid oxide fuel cells (SOFC) or molten carbonate fuel cells (MCFC) or other suitable fuel cell types. The fuel of the shown apparatus can be hydrogen, available from, for example, natural gas. Other suitable fuels are, for example, methanol, diesel oil, kerosene and other hydrocarbon-containing materials. The natural gas is introduced into the apparatus in pressurized state through inlet tube 1 via heat exchanger 2, in which fuel is heated by means of heat of the exhaust gases. A sulphur removal unit 3 is located after the heat exchanger 2, in which unit sulphur is removed from the fuel. Subsequent to the sulphur removal unit 3 the natural gas is directed into a prereformer or a reformer 4 acting as fuel modifying unit, in which hydrogen is formed from the natural gas. Water is used in forming hydrogen, the water being introduced into the apparatus under pressure along inlet tube 16 via heat exchanger 17, in which the water is vaporized by means of the heat of the exhaust gases. In the reformer 4 the hydrocarbons of the natural gas are modified by means of water vapour into hydrogen, methane and carbon oxides. In order to enhance the operation of the apparatus a part of the exhaust gases of the anode side 7 are directed via the heat exchanger 5 and the blower 13 to the inlet side of the reformer 4, whereby carbon dioxide and water vapour are mixed with the inlet flow. Fuel is directed from the reformer 4 via the said heat exchanger 5 to the anode side 7 of the fuel cell unit 6 formed by fuel cell stacks. The fuel cell stacks of the fuel cell unit 6 consist of a number of fuel cells pressed together, each fuel cell having an anode side 7, a cathode side 8 with electrolyte 9 therebetween. In the figure the fuel cell stacks and their possible combinations are schematically shown as a unit. The portion of the exhaust gases of the anode side 7 not being recirculated is directed into the afterburner 14, in which the remaining fuel is combusted and subsequent to which the exhaust gases are removed from the apparatus via heat exchangers 17, 2 and 15.

Oxygen is correspondingly introduced to the cathode side 8 entrained with air by means of a blower 10, from which air is directed along inlet tube 11 to the heat exchanger 12, in which the incoming air is preheated by means of the exhaust gases from the cathode side prior to introducing the air to the cathode side 8. Most of the heat of the exhaust gases of the cathode side is used for preheating air to be introduced to the cathode side in the heat exchanger 12, in which the exhaust gases from cathode side are directed. A smaller amount of heat is further directed along with exhaust gases to the afterburner 14 and therethrough away from the apparatus. A portion of the heat is also directly led away from the apparatus past afterburner 14 via, for example, heat exchanger 15.

FIG. 2 is a simplified and schematic illustration of a solution according to the invention applied to a heat exchanger apparatus, such as an apparatus according to FIG. 1. For clarity, FIG. 2 does not show all apparatuses shown in FIG. 1. In the apparatus, the sulphur removal unit 3 is enveloped by a casing 21, having an interior dimension suitably larger than the sulphur removal unit 3 so that a gas flow space is formed between the inner walls of the casing 21 and the sulphur removal unit 3, essentially enveloping the sulphur removal unit 3 from all sides. Accordingly, the reformer 4 or other apparatus acting as fuel modifying unit is enveloped by a casing 23 having an interior dimension suitably larger than the reformer 4 so that an exhaust gas flow space is formed between the inner walls of the casing 23 and the reformer 4, the flow space essentially enveloping the reformer 4 from all sides.

A separate fuel channel 24 is connected to the afterburner 14 through which channel untreated fuel is introduced into the afterburner. An air channel 25 is additionally connected to the fuel channel 24 for introducing air by means of a blower, the air being arranged to mix with the fuel prior to the fuel ending up in the afterburner 14. The mixing can in some cases be also carried out in the actual burner. The blower 10 shown in FIG. 1 can, for example, act as blower and it can also blow air to the cathode 8.

The exhaust gas channel 20 of the afterburner 14 is correspondingly routed so that exhaust gas can, if necessary, be directed via the necessary additional treatment, in addition to the exhaust gas channel 26 leading to the ambient air, to the sulphur removal unit 3, in more detail to the casing 21 of the sulphur removal unit 3 through channel 27 for heating the sulphur removal unit 3, through channel 28 to the heater 22 for increasing the temperature of the fuel to a temperature suitable for reforming and to the reformer 4, in more detail to the casing 23 of the reformer 4, through channel 29 for heating the reformer 4. Exhaust gas is removed from the sulphur removal unit 3, the heater 22 and the reformer 4 via outlet channels 27', 28', 29'. The outlet channels 27', 28', 29' are in flow connection with the exhaust gas channel 26. The outlet channel 27' of the sulphur removal unit 3, the outlet channel 28' of the heater 22 and the outlet channel 29' of the reformer 4 are provided with heat exchangers 31 for cooling the exhaust gas prior to directing it to the exhaust gas channel 26. The heat contained by the exhaust gas is transferred by means of heat exchangers 31 to the medium flowing in the heating circuit 32, such as gas or liquid. The medium heated in the heating circuit 32 is directed to, for example, district heating network or other heat distribution network 33.

The flow channels 24, 25 and outlet channels 27', 28', 29' are provided with an adjustment valve 30 or the like adjustment means for opening and closing the channels and for adjusting the flow rate of the gas in the channels as necessary. The adjustment valves 30 are located in the outlet channel 27' of the sulphur removal unit 3, the outlet channel 28' of the heater 22 and the outlet channel 29' of the reformer 4 downstream of the heat exchangers 31 in the flow direction of the exhaust gas. Thus the heat exchanger 31 is in the outlet channel 27' of the sulphur removal unit between the adjustment valve 30 and the sulphur removal unit 3, in the outlet channel 28' between the heater 22 and the adjustment valve 30 and in the outlet channel 29' of the reformer between the reformer 4 and the adjustment valve 30.

The apparatus further comprises an ejector 18 for carrying out the recirculation of the exhaust gases of the anode side 7. The exhaust gases of the anode side are directed from the anode 7 to the ejector via recirculation channel 19. The ejector 18 is located in the fuel inlet channel 1, such as between the sulphur removal unit 3 and the reformer 4. A blower or the like apparatus can be used instead of the ejector 18.

By means of the solution according to the invention the preheating of fuel, sulphur removal unit 3 and the reformer 4 is carried out during the start-up phase of the apparatus by directing at least a part of the raw fuel to the afterburner 14 via a separate fuel inlet channel 24 prior to the sulphur removal and by directing at least a part of the exhaust gases of the fuel thus combusted through channel 27 to the sulphur removal unit 3, such as to the casing 21 of the sulphur removal unit 3 for heating the sulphur removal unit 3. Correspondingly, a part of the exhaust gases of the fuel thus combusted is directed via channel 29 to the fuel modifying unit, such as the casing 23 of the reformer 4 for heating the modifying unit. In addition, the temperature of the fuel is increased subsequent to the sulphur removal by means of the heater 22 by directing a part of the exhaust gases of the fuel introduced through the separate channel 24 along channel 28 to the heater 22. The exhaust gas is directed from the sulphur removal unit 3, the heater 22 and the reformer 4 along outlet channels 27', 28', 29' to the heat exchangers 31, in which the exhaust gas is cooled. The heat contained by the exhaust gas is transferred by means of heat exchangers 31 to the medium flowing in the heating circuit 32. The flow of exhaust gas into the sulphur removal unit 3, the heater 22 and the reformer 4 is adjusted as desired by means of adjustment valves 30 of the outlet channels 27', 28', 29', the valves being controlled on the basis of the temperature measurements of units 3, 22, 4.

During the actual operation of the fuel cell apparatus no preheating such as during the start-up phase is needed, but the same channels 27, 28 and 29 can be used for directing exhaust gas to heat the reaction vessels and for keeping their temperature on the level required by the process. This will enable compensating for any heat losses of the process and increasing the efficiency of the process.

It will be obvious to one skilled in the art that the invention is not limited to the above-mentioned embodiment, but it can be modified within the following appended claims. Thus the design of the apparatus and the design components used can vary from what is described above. Thus, for example, the sulphur removal unit and the reformer or pre-reformer acting as fuel modifying units can be arranged in one casing instead of two separate casings.

It will also be obvious to one skilled in the art that the circulation of the materials being circulated in the apparatus, such as fuel, exhaust gases and air, does not need to be similar to what is described above, but the circulation can be carried out in a number of ways and using different apparatus configurations.

It will as well be obvious to one skilled in the art that the fuel modifying unit can differ depending on the apparatus configuration, yet be an apparatus suitable for this purpose.

It will further be obvious to one skilled in the art that the solution according to the invention is not limited to only the said solid oxide fuel cells (SOFC) or molten carbonate fuel cells (MCFC) but it can be used in connection with a number of other types of fuel cells.

It will additionally be obvious to one skilled in the art that instead of the said natural gas, the fuel used can be any other fuel suitable for use in fuel cells. Other material can be used instead of hydrogen as well, whereby a corresponding fuel treatment unit can be used instead of the reformer.

The invention claimed is:

1. A preheating arrangement in a fuel cell apparatus, the fuel cell apparatus comprising at least a fuel cell unit, the fuel cells of which comprise an anode side and a cathode side with an electrolyte therebetween, the fuel cell apparatus comprising a fuel inlet on the anode side and an oxygen-containing air inlet on the cathode side as well as a sulphur removal unit, a fuel modifying unit and a burner for combusting exhaust gases from the anode and cathode side, the afterburner being provided with a separate fuel inlet channel for introducing fuel to the afterburner during the start-up phase of the fuel cell apparatus, the arrangement comprising:
 a channel from the afterburner to the sulphur removal unit for directing exhaust gas from the afterburner to the sulphur removal unit and an outlet channel for removing exhaust gas from the sulphur removal unit, and
 a channel from the afterburner to the modifying unit for directing exhaust gas from the afterburner to the modifying unit and an outlet channel for removing exhaust gas from the modifying unit, wherein the outlet channel of the sulphur removal unit is provided with an adjustment means for adjusting the exhaust gas flow rate and with a heat exchanger between the adjustment means and the sulphur removal unit, and the outlet channel of the modifying unit is provided with an adjustment means for adjusting the exhaust gas flow rate and the outlet channel is provided with a heat exchanger between the adjustment means and the modifying unit.

2. A preheating arrangement according to claim 1, wherein the sulphur removal unit is enveloped by a casing into which the channel from the afterburner to the sulphur removal unit is connected for directing exhaust gas from the afterburner into the casing of the sulphur removal unit, and the fuel modifying unit is enveloped by a casing into which the channel from the afterburner to the fuel modifying unit is connected for directing exhaust gas from the afterburner into the casing of the fuel modifying unit.

3. A preheating arrangement according to claim 1, wherein the separate fuel inlet channel is connected to the fuel inlet prior to the sulphur removal unit.

4. A preheating arrangement according to claim 1, wherein an air channel is connected to the separate fuel inlet channel for introducing additional air to the afterburner.

5. A preheating arrangement according to claim 1, wherein the arrangement comprises a heater located in the fuel inlet channel for heating the fuel and a channel from the afterburner to the heater for directing exhaust gas from the afterburner to the heater and an outlet channel for removing exhaust gas from the heater.

6. A preheating arrangement according to claim 5, wherein the outlet channel of the heater is provided with an adjustment means for adjusting the exhaust gas flow and with a heat exchanger between the adjustment means and the heater.

7. A method of preheating a fuel cell apparatus, the fuel cell apparatus comprising a fuel cell unit, the fuel cells of which comprise an anode side and a cathode side with electrolyte therebetween, the fuel cell apparatus having at least a fuel inlet to the anode side and an oxygen-containing air inlet to the cathode side as well as a sulphur removal unit, a fuel modifying unit and a burner for combusting exhaust gases from the anode and cathode sides, in which method fuel is introduced during the fuel cell start-up phase to the afterburner, fuel is combusted in the afterburner, the sulphur removal unit is heated by directing exhaust gas of the fuel combusted in the afterburner to the sulphur removal unit and exhaust gas is removed from the sulphur removal unit via an outlet channel and the fuel modifying unit is heated by directing exhaust gas of the fuel combusted in the afterburner to the modifying unit and exhaust gas is removed from the modifying unit via an outlet channel, wherein
 the exhaust gas flow to the sulphur removal unit is adjusted by means of an adjustment means arranged in the outlet channel of the sulphur removal unit and the exhaust gas flow is cooled by means of a heat exchanger located in the outlet channel between the adjustment means and the sulphur removal unit, and
 the exhaust gas flow to the modifying unit is adjusted by means of an adjustment means arranged in the outlet channel of the modifying unit and the exhaust gas flow is cooled by means of a heat exchanger located in the outlet channel between the adjustment means and the modifying unit.

8. A method according to claim 7, wherein the arrangement comprises a heater located in the fuel inlet channel for heating the fuel, the heater being heated by directing exhaust gas of fuel combusted in the afterburner to the heater, exhaust gas is removed from the heater along an outlet channel, the exhaust gas flow to the heater is adjusted by means of an adjustment means located in the of the heater and the exhaust gas flow is cooled by means of a heat exchanger located in the outlet channel between the adjustment means and the heater.

9. A method according to claim 7, wherein the exhaust gas flow to the sulphur removal unit and the modifying unit is controlled on the basis of the temperature measurement of said unit.

10. A method according to claim 8, wherein the exhaust gas flow to the heater is controlled on the basis of the temperature measurement of said heater.

11. A fuel cell apparatus having a fuel inlet and an oxygen-containing air inlet and comprising:
   a fuel cell unit having an anode side connected to receive fuel from the fuel inlet of the apparatus and a cathode side connected to receive oxygen-containing air from the oxygen-containing air inlet of the apparatus,
   a sulphur removal unit,
   a fuel modifying unit,
   an afterburner for combusting exhaust gases from at least one of the anode side and the cathode side of the fuel cell unit, the afterburner being provided with a separate fuel inlet channel for introducing fuel to the afterburner during a startup phase of operation of the fuel cell apparatus, and
   a preheating arrangement comprising:
   a channel from the afterburner to the sulphur removal unit for directing exhaust gas to the sulphur removal unit and an outlet channel for removing exhaust gas from the sulphur removal unit, the outlet channel of the sulphur removal unit being provided with an adjustment means for adjusting the exhaust gas flow rate and with a heat exchanger between the adjustment means and the sulphur removal unit, and
   a channel from the afterburner to the modifying unit for directing exhaust gas to the modifying unit and an outlet channel for removing exhaust gas from the modifying unit, the outlet channel of the modifying unit being provided with an adjustment means for adjusting the exhaust gas flow rate and with a heat exchanger between the adjustment means and the modifying unit.

* * * * *